US012612041B2

(12) United States Patent
Glaser et al.

(10) Patent No.: US 12,612,041 B2
(45) Date of Patent: Apr. 28, 2026

(54) INTELLIGENT ADAPTIVE CRUISE CONTROL SYSTEM AND METHOD

(71) Applicant: GM Global Technology Operations LLC, Detroit, MI (US)

(72) Inventors: Daniel S. Glaser, Novi, MI (US); Joseph F. Szczerba, Grand Blanc, MI (US); Ron Hecht, Raanana (IL); Omer Tsimhoni, Warren, MI (US); James V. Roell, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 119 days.

(21) Appl. No.: 18/734,473

(22) Filed: Jun. 5, 2024

(65) Prior Publication Data

US 2025/0376160 A1 Dec. 11, 2025

(51) Int. Cl.
| | |
|---|---|
| *B60W 30/14* | (2006.01) |
| *B60W 30/16* | (2020.01) |
| *G06N 7/01* | (2023.01) |

(52) U.S. Cl.
CPC .......... *B60W 30/143* (2013.01); *B60W 30/16* (2013.01); *G06N 7/01* (2023.01); *B60W 2420/403* (2013.01); *B60W 2420/408* (2024.01); *B60W 2420/54* (2013.01); *B60W 2520/10* (2013.01); *B60W 2554/4041* (2020.02); *B60W 2554/4042* (2020.02); *B60W 2554/4044* (2020.02); *B60W 2554/802* (2020.02)

(58) Field of Classification Search
CPC .............. B60W 30/143; B60W 30/16; B60W 2420/403; B60W 2420/408; B60W 2420/54; B60W 2520/10; B60W 2554/4041; B60W 2554/4042; B60W 2554/4044; B60W 2554/802; G06N 7/01
See application file for complete search history.

(56) References Cited

U.S. PATENT DOCUMENTS

| | | | | |
|---|---|---|---|---|
| 2020/0062255 | A1* | 2/2020 | Fernando | ............ B60W 30/188 |
| 2024/0025404 | A1* | 1/2024 | Gupta | ...................... G06N 7/01 |
| 2025/0058802 | A1* | 2/2025 | Chen | ................. B60W 60/0027 |
| 2025/0200979 | A1* | 6/2025 | Yan | ......................... G06V 10/82 |

FOREIGN PATENT DOCUMENTS

| | | |
|---|---|---|
| DE | 102015120996 A1 | 6/2016 |
| DE | 102016225855 A1 | 6/2018 |
| DE | 102019122757 A1 | 2/2020 |

* cited by examiner

*Primary Examiner* — Navid Z. Mehdizadeh
(74) *Attorney, Agent, or Firm* — Vivacqua Crane, PLLC

(57) ABSTRACT

A method for adaptive cruise control for a vehicle may include performing a plurality of measurements of an environment surrounding the vehicle using a vehicle perception sensor. The environment surrounding the vehicle includes a plurality of remote vehicles. The method further may include determining one or more speed decision algorithm inputs based at least in part on the plurality of measurements. The method further may include determining an optimal vehicle speed for the vehicle based at least in part on the one or more speed decision algorithm inputs. The method further may include controlling the vehicle such that a speed of the vehicle is the optimal vehicle speed.

20 Claims, 4 Drawing Sheets

122

122a

122

122b

INTELLIGENT ADAPTIVE CRUISE CONTROL SYSTEM AND METHOD

INTRODUCTION

The present disclosure relates to cruise control systems and methods for vehicles.

To increase occupant awareness and convenience, vehicles may be equipped with advanced driver assistance systems (ADAS). ADAS systems may use various sensors such as cameras, radar, and LiDAR to detect and identify objects around the vehicle, including other vehicles, pedestrians, road configurations, traffic signs, and road markings. ADAS systems may take actions based on environmental conditions surrounding the vehicle, such as applying brakes and/or alerting an occupant of the vehicle. ADAS systems may also provide assistive features such as, for example, adaptive cruise control features. Adaptive cruise control is a type of ADAS feature which automatically adjusts vehicle speed in order to maintain an ideal distance from vehicles ahead. Adaptive cruise control may use sensor information from various sensors such as cameras, radar, and LiDAR to measure the distance between the vehicle and a lead vehicle and adjust acceleration and/or braking of the vehicle in order to maintain a following distance between the vehicle and the lead vehicle. However, current ADAS systems and adaptive cruise control features may not account for behaviors and trajectories of other remote vehicles besides the lead vehicle in the vicinity of the vehicle.

Thus, while ADAS and adaptive cruise control systems and methods achieve their intended purpose, there is a need for a new and improved system and method for adaptive cruise control for a vehicle.

SUMMARY

According to several aspects, a method for adaptive cruise control for a vehicle is provided. The method may include performing a plurality of measurements of an environment surrounding the vehicle using a vehicle perception sensor. The environment surrounding the vehicle includes a plurality of remote vehicles. The method further may include determining one or more speed decision algorithm inputs based at least in part on the plurality of measurements. The method further may include determining an optimal vehicle speed for the vehicle based at least in part on the one or more speed decision algorithm inputs. The method further may include controlling the vehicle such that a speed of the vehicle is the optimal vehicle speed.

In another aspect of the present disclosure, performing the plurality of measurements further may include measuring a position of each of the plurality of remote vehicles using the vehicle perception sensor. Performing the plurality of measurements further may include saving the position of each of the plurality of remote vehicles and a time at which the position of each of the plurality of remote vehicles was measured in a non-transitory memory. Performing the plurality of measurements further may include repeating the measuring step and the saving step at a predetermined interval such as to accumulate a plurality of position measurements over time for each of the plurality of remote vehicles. Performing the plurality of measurements further may include determining a trajectory of each of the plurality of remote vehicles based at least in part on the plurality of position measurements over time.

In another aspect of the present disclosure, determining the optimal vehicle speed further may include training a plurality of pre-trained Gaussian Mixture Models (GMM) using a plurality of training data. Each of the plurality of pre-trained GMMs is associated with one of a plurality of trained optimal speeds. Determining the optimal vehicle speed further may include training a current observation GMM based at least in part on the trajectory of each of the plurality of remote vehicles. Determining the optimal vehicle speed further may include comparing the current observation GMM to the plurality of pre-trained GMMs. Determining the optimal vehicle speed further may include selecting a matching pre-trained GMM from the plurality of pre-trained GMMs which most closely matches with the current observation GMM. Determining the optimal vehicle speed further may include determining the optimal vehicle speed based at least in part on the one of the plurality of trained optimal speeds associated with the matching pre-trained GMM.

In another aspect of the present disclosure, determining the optimal vehicle speed further may include receiving a desired speed range from an occupant of the vehicle. Determining the optimal vehicle speed further may include determining the optimal vehicle speed based at least in part on the one of the plurality of trained optimal speeds associated with the matching pre-trained GMM and the desired speed range.

In another aspect of the present disclosure, determining the optimal vehicle speed further may include training a current observation Gaussian Mixture Model (GMM) based at least in part on the trajectory of each of the plurality of remote vehicles. Determining the optimal vehicle speed further may include receiving a desired speed range from an occupant of the vehicle. Determining the optimal vehicle speed further may include executing an optimal speed determination machine learning algorithm. The optimal speed determination machine learning algorithm is configured to receive the current observation GMM, the desired speed range, and the one or more speed decision algorithm inputs as inputs and provide the optimal vehicle speed as an output.

In another aspect of the present disclosure, determining the one or more speed decision algorithm inputs further may include determining a speed of a lead vehicle of the plurality of remote vehicles based at least in part on the plurality of measurements. The lead vehicle is directly ahead of the vehicle and in a same driving lane as the vehicle. Determining the one or more speed decision algorithm inputs further may include determining the one or more speed decision algorithm inputs, where the one or more speed decision algorithm inputs includes at least the speed of the lead vehicle.

In another aspect of the present disclosure, determining the one or more speed decision algorithm inputs further may include determining a speed of one or more adjacent vehicles of the plurality of remote vehicles based at least in part on the plurality of measurements. The one or more adjacent vehicles are located within a predetermined radius of the vehicle. The one or more adjacent vehicles are located in a different driving lane from the vehicle. Determining the one or more speed decision algorithm inputs further may include determining the one or more speed decision algorithm inputs, where the one or more speed decision algorithm inputs includes at least the speed of the one or more adjacent vehicles.

In another aspect of the present disclosure, determining the one or more speed decision algorithm inputs further may include determining a following distance of a following vehicle of the plurality of remote vehicles based at least in part on the plurality of measurements. The following vehicle is located directly behind the vehicle and in a same driving lane as the vehicle. The following distance is a distance between the following vehicle and the vehicle. Determining the one or more speed decision algorithm inputs further may include determining the one or more speed decision algorithm inputs, where the one or more speed decision algorithm inputs includes at least the following distance.

In another aspect of the present disclosure, determining the one or more speed decision algorithm inputs further may include determining a current driving lane of the vehicle based at least in part on the plurality of measurements. Determining the one or more speed decision algorithm inputs further may include determining the one or more speed decision algorithm inputs, where the one or more speed decision algorithm inputs includes at least the current driving lane of the vehicle.

In another aspect of the present disclosure, determining the one or more speed decision algorithm inputs further may include receiving one or more occupant inputs from an occupant of the vehicle. Determining the one or more speed decision algorithm inputs further may include determining the one or more speed decision algorithm inputs, where the one or more speed decision algorithm inputs includes at least the one or more occupant inputs.

According to several aspects, a system for adaptive cruise control for a vehicle is provided. The system may include a vehicle perception sensor, an automated driving system, and a controller in electrical communication with the vehicle perception sensor and the automated driving system. The controller is programmed to perform a plurality of measurements of an environment surrounding the vehicle using the vehicle perception sensor. The environment surrounding the vehicle includes a plurality of remote vehicles. The plurality of measurements includes a trajectory of each of the plurality of remote vehicles. The controller is further programmed to determine one or more speed decision algorithm inputs based at least in part on the plurality of measurements. The controller is further programmed to determine an optimal vehicle speed for the vehicle based at least in part on the one or more speed decision algorithm inputs. The controller is further programmed to control the vehicle using the automated driving system such that a speed of the vehicle is the optimal vehicle speed.

In another aspect of the present disclosure, to determine the optimal vehicle speed, the controller is further programmed to train a current observation GMM based at least in part on the trajectory of each of the plurality of remote vehicles and the one or more speed decision algorithm inputs. To determine the optimal vehicle speed, the controller is further programmed to compare the current observation GMM to a plurality of pre-trained GMMs. Each of the plurality of pre-trained GMMs is associated with one of a plurality of trained optimal speeds. To determine the optimal vehicle speed, the controller is further programmed to select a matching pre-trained GMM from the plurality of pre-trained GMMs which most closely matches with the current observation GMM. To determine the optimal vehicle speed, the controller is further programmed to determine the optimal vehicle speed based at least in part on the one of the plurality of trained optimal speeds associated with the matching pre-trained GMM.

In another aspect of the present disclosure, to determine the optimal vehicle speed, the controller is further programmed to receive a desired speed range from an occupant of the vehicle. To determine the optimal vehicle speed, the controller is further programmed to determine the optimal vehicle speed based at least in part on the one of the plurality of trained optimal speeds associated with the matching pre-trained GMM and the desired speed range.

In another aspect of the present disclosure, to determine the optimal vehicle speed, the controller is further programmed to train a current observation GMM based at least in part on the trajectory of each of the plurality of remote vehicles. To determine the optimal vehicle speed, the controller is further programmed to receive a desired speed range from an occupant of the vehicle. To determine the optimal vehicle speed, the controller is further programmed to execute an optimal speed determination machine learning algorithm. The optimal speed determination machine learning algorithm is configured to receive the current observation GMM, the desired speed range, and the one or more speed decision algorithm inputs as inputs and provide the optimal vehicle speed as an output.

In another aspect of the present disclosure, to determine the one or more speed decision algorithm inputs, the controller is further programmed to determine a speed of a lead vehicle of the plurality of remote vehicles based at least in part on the plurality of measurements. The lead vehicle is directly ahead of the vehicle and in a same driving lane as the vehicle. To determine the one or more speed decision algorithm inputs, the controller is further programmed to determine a speed of one or more adjacent vehicles of the plurality of remote vehicles based at least in part on the plurality of measurements. The one or more adjacent vehicles are located within a predetermined radius of the vehicle. The one or more adjacent vehicles are located in a different driving lane from the vehicle. To determine the one or more speed decision algorithm inputs, the controller is further programmed to determine a following distance of a following vehicle of the plurality of remote vehicles based at least in part on the plurality of measurements. The following vehicle is located directly behind the vehicle and in a same driving lane as the vehicle. The following distance is a distance between the following vehicle and the vehicle. To determine the one or more speed decision algorithm inputs, the controller is further programmed to determine a current driving lane of the vehicle based at least in part on the plurality of measurements. To determine the one or more speed decision algorithm inputs, the controller is further programmed to determine the one or more speed decision algorithm inputs, where the one or more speed decision algorithm inputs includes at least the speed of the lead vehicle, the speed of the one or more adjacent vehicles, the following distance, and the current driving lane.

In another aspect of the present disclosure, to determine the one or more speed decision algorithm inputs, the controller is further programmed to receive one or more occupant inputs from an occupant of the vehicle. The one or more occupant inputs includes at least a desired speed range. To determine the one or more speed decision algorithm inputs, the controller is further programmed to determine the one or more speed decision algorithm inputs, where the one or more speed decision algorithm inputs includes at least the one or more occupant inputs.

In another aspect of the present disclosure, to control the vehicle using the automated driving system, the controller is further programmed to continuously monitor the one or more occupant inputs from the occupant of the vehicle. To control the vehicle using the automated driving system, the controller is further programmed to command the automated driving system to control acceleration and braking of the vehicle based at least in part on the optimal vehicle speed and the one or more occupant inputs.

According to several aspects, a method for adaptive cruise control for a vehicle is provided. The method may include measuring a position of each of a plurality of remote vehicles using a vehicle perception sensor. The method further may include saving the position of each of the plurality of remote vehicles and a time at which the position of each of the plurality of remote vehicles was measured in a non-transitory memory. The method further may include repeating the measuring step and the saving step at a predetermined interval such as to accumulate a plurality of position measurements over time for each of the plurality of remote vehicles. The method further may include determining a trajectory of each of the plurality of remote vehicles based at least in part on the plurality of position measurements over time. The trajectory of each of the plurality of remote vehicles includes at least a position, a velocity, an acceleration, and a jerk of each of the plurality of remote vehicles. The method further may include determining one or more speed decision algorithm inputs based at least in part on the trajectory of each of the plurality of remote vehicles. The method further may include determining an optimal vehicle speed for the vehicle based at least in part on the one or more speed decision algorithm inputs. The method further may include controlling the vehicle such that a speed of the vehicle is the optimal vehicle speed.

In another aspect of the present disclosure, determining the one or more speed decision algorithm inputs further may include determining a speed of a lead vehicle of the plurality of remote vehicles based at least in part on the trajectory of each of the plurality of remote vehicles. The lead vehicle is directly ahead of the vehicle and in a same driving lane as the vehicle. Determining the one or more speed decision algorithm inputs further may include determining a speed of one or more adjacent vehicles of the plurality of remote vehicles based at least in part on the trajectory of each of the plurality of remote vehicles. The one or more adjacent vehicles are located within a predetermined radius of the vehicle. The one or more adjacent vehicles are located in a different driving lane from the vehicle. Determining the one or more speed decision algorithm inputs further may include determining a following distance of a following vehicle of the plurality of remote vehicles based at least in part on the trajectory of each of the plurality of remote vehicles. The following vehicle is located directly behind the vehicle and in a same driving lane as the vehicle. The following distance is a distance between the following vehicle and the vehicle. Determining the one or more speed decision algorithm inputs further may include determining a current driving lane of the vehicle based at least in part on the trajectory of each of the plurality of remote vehicles. Determining the one or more speed decision algorithm inputs further may include determining the one or more speed decision algorithm inputs, where the one or more speed decision algorithm inputs includes at least the speed of the lead vehicle, the speed of the one or more adjacent vehicles, the following distance, and the current driving lane.

In another aspect of the present disclosure, determining the optimal vehicle speed further may include training a plurality of pre-trained Gaussian Mixture Models (GMM) using a plurality of training data. The plurality of training data includes a plurality of sets of training vehicle trajectories. Each of the plurality of sets of training vehicle trajectories is labeled with one of a plurality of trained optimal speeds. Determining the optimal vehicle speed further may include training a current observation GMM based at least in part on the trajectory of each of the plurality of remote vehicles and the one or more speed decision algorithm inputs. Determining the optimal vehicle speed further may include comparing the current observation GMM to the plurality of pre-trained GMMs. Determining the optimal vehicle speed further may include selecting a matching pre-trained GMM from the plurality of pre-trained GMMs which most closely matches with the current observation GMM. Determining the optimal vehicle speed further may include receiving a desired speed range from an occupant of the vehicle. Determining the optimal vehicle speed further may include determining the optimal vehicle speed based at least in part on the one of the plurality of trained optimal speeds associated with the matching pre-trained GMM and the desired speed range.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, adaptive cruise control systems and methods are used to used to allow semi-autonomous driving of a vehicle when driving on, for example, a highway. The present disclosure provides a new and improved system and method for adaptive cruise control for a vehicle, including determination of an optimal vehicle speed for the vehicle based on multiple factors, including trajectories and behaviors of multiple remote vehicles in the vicinity of the vehicle.

Figure 1:
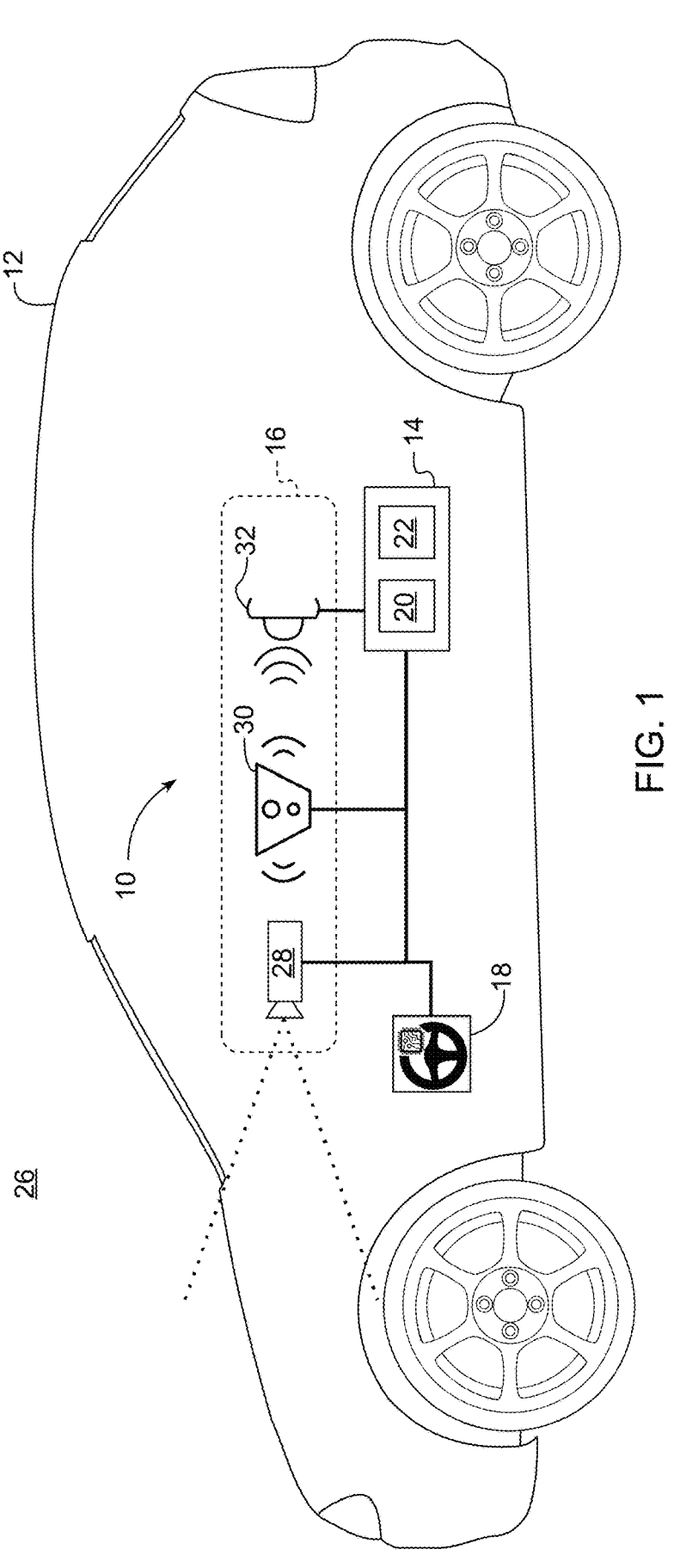
FIG. 1 is a schematic diagram of a system for adaptive cruise control for a vehicle, according to an exemplary embodiment.

Referring to FIG. 1, a system for adaptive cruise control for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a vehicle perception sensor 16, and an automated driving system 18.

The controller 14 is used to implement a method 100 for adaptive cruise control for a vehicle, as will be described below. The controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions.

The computer readable storage device or media 22 may include volatile and nonvolatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12.

The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the vehicle perception sensor 16. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure. It should further be understood that, in the scope of the present disclosure, electrical communication also includes power and/or energy transfer between electrical devices (e.g., using conducting wires and/or wireless power transmission techniques).

The vehicle perception sensor 16 is used to perceive objects in an environment 26 surrounding the vehicle 12. Furthermore, the vehicle perception sensor 16 is used to measure distances between multiple objects in the environment 26 and distances between the vehicle 12 and objects in the environment 26. In an exemplary embodiment, the vehicle perception sensor 16 includes at least one of: a camera 28, a light detection and ranging (LiDAR) sensor 30, and an ultrasonic sensor 32.

The camera 28 is used to capture images and/or videos of the environment 26 surrounding the vehicle 12. In an exemplary embodiment, the camera 28 includes one or more cameras having a view of the environment 26 surrounding the vehicle 12. In a non-limiting example, the camera 28 is affixed within the vehicle 12, for example, to a headliner or a windscreen of the vehicle 12, having a view through the windscreen of the vehicle 12. In another non-limiting example, the camera 28 is affixed to an exterior of the vehicle 12, for example, on a roof of the vehicle 12, having a view of the environment 26 surrounding the vehicle 12.

In another exemplary embodiment, the camera 28 includes a surround view camera system including a plurality of cameras (also known as satellite cameras) arranged to provide a view of the environment 26 adjacent to all sides of the vehicle 12. In a non-limiting example, the camera system includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera system further includes an additional rear-view camera mounted near a center high mounted stop lamp of the vehicle 12.

It should be understood that camera systems having additional cameras and/or additional mounting locations are within the scope of the present disclosure. It should further be understood that the camera 28 may include a stereoscopic camera having distance measurement capabilities, an infrared camera, a thermal camera, and/or any other type of camera or image sensing device without departing from the scope of the present disclosure. The camera 28 is in electrical communication with the controller 14, as discussed above.

The LiDAR sensor 30 is used for remote sensing and environmental mapping. The LiDAR sensor 30 functions by emitting laser pulses and measuring the time it takes for the laser pulses to return to the LIDAR sensor 30 after hitting objects. In an exemplary embodiment, the LiDAR sensor 30 includes a LIDAR laser source, a LIDAR scanner or mirror, a LIDAR photodetector, and a LIDAR time-of-flight measurement system. In a non-limiting example, the LiDAR laser source emits laser pulses that travel to the target area, and the LiDAR scanner directs these pulses in different directions. The emitted laser pulses interact with objects in the environment and their reflections are captured by the LiDAR photodetector. The LiDAR time-of-flight measurement system calculates the distance to the objects based on the time between emission of the laser pulses by the LiDAR laser source and reception of the reflected laser pulses by the LiDAR photodetector. The LiDAR sensor 30 is in electrical communication with the controller 14, as discussed above.

The ultrasonic sensor 32 is used to measure distances in the environment 26 surrounding the vehicle 12. In an exemplary embodiment, the ultrasonic sensor 32 includes an ultrasonic transducer and an ultrasonic receiver. The ultrasonic transducer emits ultrasonic pulses, and the ultrasonic receiver captures ultrasonic pulses after they have reflected off of an object. In a non-limiting example, the ultrasonic transducer transmits ultrasonic waves, which bounce off the object and return to the ultrasonic receiver. The ultrasonic sensor 32 measures the time it takes for the ultrasonic pulses to make the round trip from the ultrasonic transducer to the ultrasonic receiver and calculates a distance based on the speed of sound in a given medium (e.g., air). The ultrasonic sensor 32 is in electrical communication with the controller 14, as discussed above.

It should be understood that the foregoing discussion of the camera 28, the LiDAR sensor 30, and the ultrasonic sensor 32 is merely exemplary in nature, and that the vehicle perception sensor 16 may include any number of additional or alternative sensors, including, for example, radar sensors and/or the like without departing from the scope of the present disclosure.

The automated driving system 18 is used to provide assistance to an occupant of the vehicle 12 to increase occupant awareness and/or control behavior of the vehicle 12. In the scope of the present disclosure, the automated driving system 18 encompasses systems which provide any level of assistance to the occupant (e.g., blind spot warning, lane departure warning, and/or the like) and systems which are capable of autonomously driving the vehicle 12 under some or all conditions (e.g., automated lane keeping, adaptive cruise control, fully autonomous driving, and/or the like). It should be understood that all levels of driving automation defined by, for example, SAE J3016 (i.e., SAE LEVEL 0, SAE LEVEL 1, SAE LEVEL 2, SAE LEVEL 3, SAE LEVEL 4, and SAE LEVEL 5) are within the scope of the present disclosure.

In an exemplary embodiment, the automated driving system 18 is configured to detect and/or receive information about the environment 26 surrounding the vehicle 12 and process the information to provide assistance to the occupant. In some embodiments, the automated driving system 18 is a software module executed on the controller 14. In other embodiments, the automated driving system 18 includes a separate automated driving system controller, similar to the controller 14, capable of processing the information about the environment 26 surrounding the vehicle 12. In an exemplary embodiment, the automated driving system 18 may operate in a manual operation mode, a partially automated operation mode, and a fully automated operation mode.

In the scope of the present disclosure, the manual operation mode means that the automated driving system 18 provides warnings or notifications to the occupant but does not intervene or control the vehicle 12 directly. In a non-limiting example, the automated driving system 18 receives information from the vehicle perception sensor 16. Using techniques such as, for example, computer vision, the automated driving system 18 understands the environment 26 surrounding the vehicle 12 and provides assistance to the occupant. For example, if the automated driving system 18 identifies, based on data from the vehicle perception sensor 16, that the vehicle 12 is likely to collide with a remote vehicle, the automated driving system 18 may use a display to provide a warning to the occupant.

In the scope of the present disclosure, the partially automated operation mode means that the automated driving system 18 provides warnings or notifications to the occupant and may intervene or control the vehicle 12 directly in certain situations. In a non-limiting example, the automated driving system 18 is additionally in electrical communication with components of the vehicle 12 such as a brake system, a propulsion system, and/or a steering system of the vehicle 12, such that the automated driving system 18 may control the behavior of the vehicle 12. In a non-limiting example, the automated driving system 18 may control the behavior of the vehicle 12 by applying brakes of the vehicle 12 to avoid an imminent collision. In another non-limiting example, the automated driving system 18 may control the steering system of the vehicle 12 to provide an automated lane keeping feature. In another non-limiting example, the automated driving system 18 may control the brake system, propulsion system, and steering system of the vehicle 12 to temporarily drive the vehicle 12 towards a predetermined destination. However, intervention by the occupant may be required at any time. In an exemplary embodiment, the automated driving system 18 may include additional components such as, for example, an eye tracking device configured to monitor an attention level of the occupant and ensure that the occupant is prepared to take over control of the vehicle 12.

In the scope of the present disclosure, the fully automated operation mode means that the automated driving system 18 uses data from the vehicle perception sensor 16 to understand the environment 26 and control the vehicle 12 to drive the vehicle 12 to a predetermined destination without a need for control or intervention by the occupant.

The automated driving system 18 operates using a path planning algorithm which is configured to generate a safe and efficient trajectory for the vehicle 12 to navigate in the environment surrounding the vehicle 12. In an exemplary embodiment, the path planning algorithm is a machine learning algorithm trained to output control signals for the vehicle 12 based on input data collected from the vehicle perception sensor 16. In another exemplary embodiment, the path planning algorithm is a deterministic algorithm which has been programmed to output control signals for the vehicle 12 based on data collected from the vehicle perception sensor 16.

In a non-limiting example, the path planning algorithm generates a sequence of waypoints or a continuous path that the vehicle 12 should follow to reach a destination while adhering to rules, regulations, and safety constraints. The sequence of waypoints or continuous path is generated based at least in part on a detailed map and a current state of the vehicle 12 (i.e., position, velocity, and orientation of the vehicle 12). The detailed map includes, for example, information about lane boundaries, road geometry, speed limits, traffic signs, and/or other relevant features. In an exemplary embodiment, the detailed map is stored in the media 22 of the controller 14 and/or on a remote database or server. In another exemplary embodiment, the path planning algorithm performs perception and mapping tasks to interpret data collected from the vehicle perception sensor 16 and create, update, and/or augment the detailed map.

It should be understood that the automated driving system 18 may include any software and/or hardware module configured to operate in the manual operation mode, the partially automated operation mode, or the fully automated operation mode as described above. The automated driving system 18 is in electrical communication with the controller 14, as discussed above.

Figure 2:
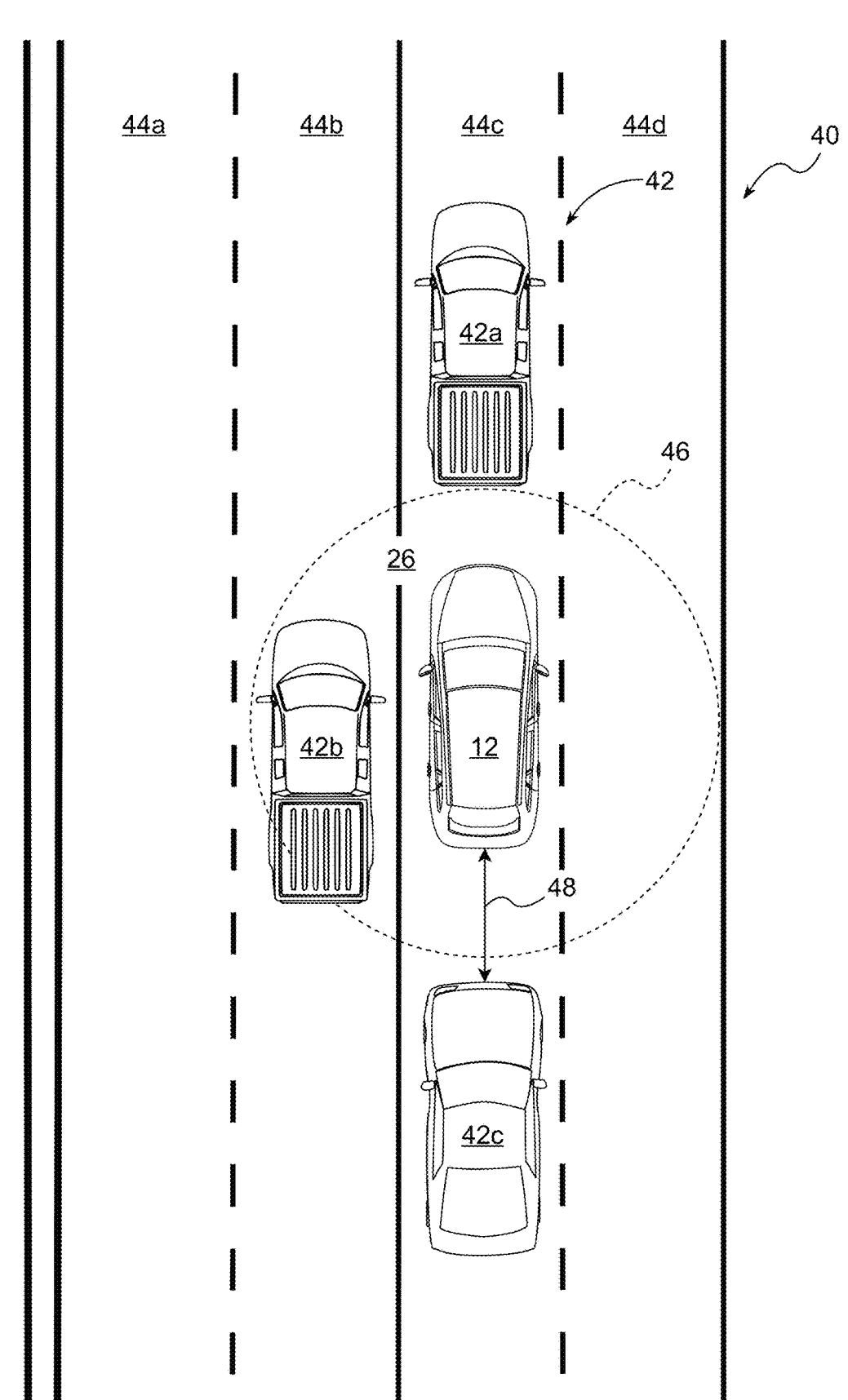
FIG. 2 is a schematic diagram of an environment including a roadway and a plurality of remote vehicles, according to an exemplary embodiment.

Referring to FIG. 2, a schematic diagram of the environment 26 including a roadway 40 and a plurality of remote vehicles 42 is shown. In an exemplary embodiment, the roadway 40 includes a first driving lane 44a, a second driving lane 44b, a third driving lane 44c, and a fourth driving lane 44d. In a non-limiting example, the vehicle 12 is located in the third driving lane 44c. The plurality of remote vehicles 42 includes a lead vehicle 42a located directly ahead of the vehicle 12 in the same driving lane as the vehicle 12 (i.e., the third driving lane 44c). The plurality of remote vehicles 42 further includes one or more adjacent vehicles 42b located within a predetermined radius 46 of the vehicle 12 and in a different driving lane from the vehicle 12 (i.e., the first driving lane 44a, the second driving lane 44b, or the fourth driving lane 44d). The plurality of remote vehicles 42 further includes a following vehicle 42c located directly behind of the vehicle 12 in the same driving lane as the vehicle 12 (i.e., the third driving lane 44c). A following distance 48 is defined as a distance between the following vehicle 42c and the vehicle 12.

Figure 3:
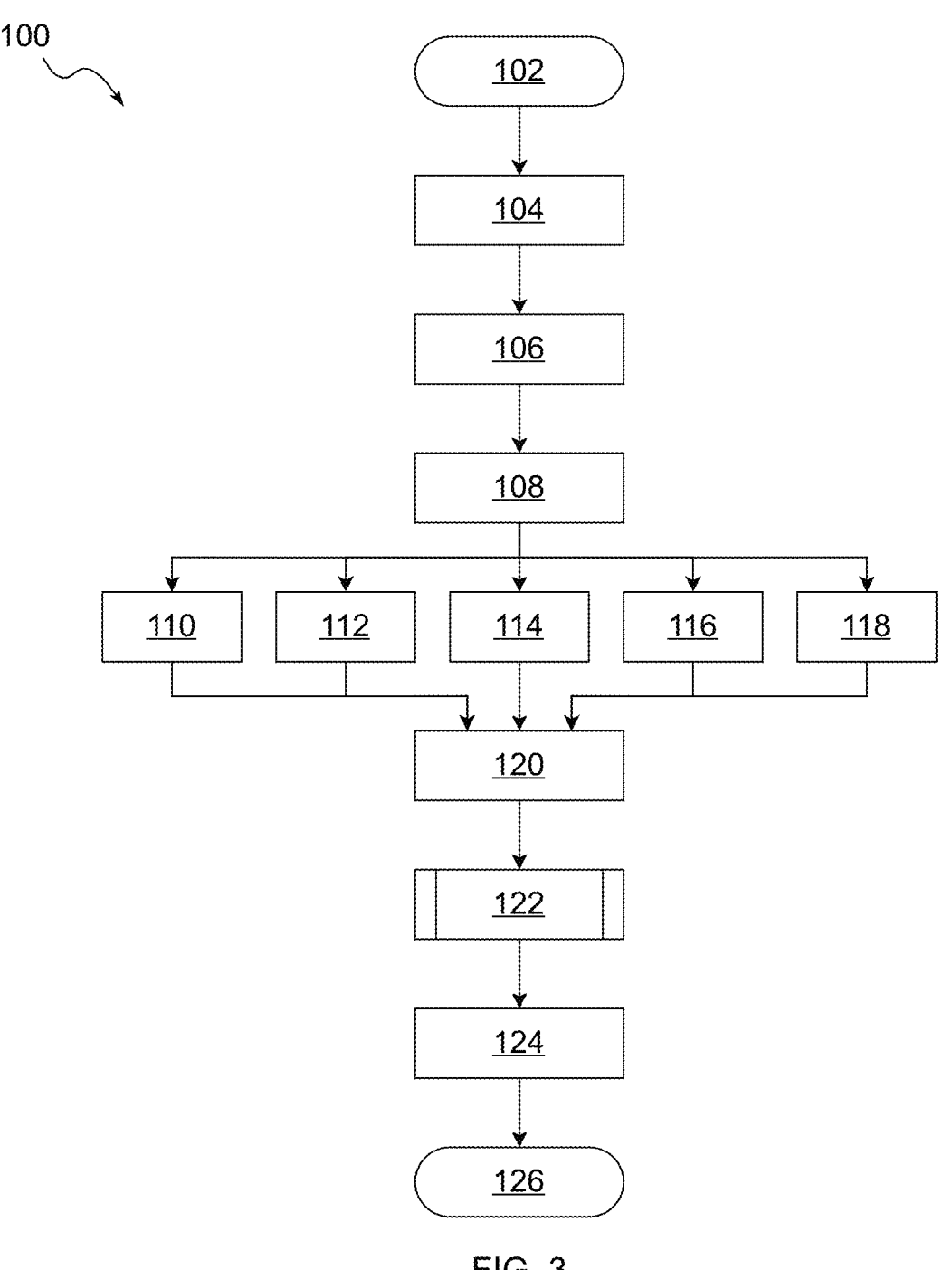
FIG. 3 is a flowchart of a method for adaptive cruise control for a vehicle, according to an exemplary embodiment.

Referring to FIG. 3, a flowchart of the method 100 for adaptive cruise control for a vehicle is provided. The method 100 begins at block 102 and proceeds to block 104. At block 104, the controller 14 uses the vehicle perception sensor 16 to measure a position of each of the plurality of remote vehicles 42. In a non-limiting example, the controller 14 uses the LiDAR sensor 30 to measure the position of each of the plurality of remote vehicles 42 relative to the vehicle 12. In another non-limiting example, the controller 14 uses the camera 28 to capture a plurality of images of the plurality of remote vehicles 42 and processes the plurality of images using a computer vision algorithm to determine the position of each of the plurality of remote vehicles 42 relative to the vehicle 12. It should be understood that the controller 14 may further use the vehicle perception sensor 16 to perceive, measure, and/or understand additional relevant objects in the environment 26, including, for example, road signs, road edges, lane lines, and/or the like. After block 104, the method 100 proceeds to block 106.

At block 106, the controller 14 saves the position of each of the plurality of remote vehicles 42 measured at block 104 in the media 22 of the controller 14. Furthermore, the controller 14 saves a time at which the position of each of the plurality of remote vehicles 42 was measured in the media 22. In an exemplary embodiment, the controller 14 repeats the measuring step at block 104 and the saving step at block 106 at a predetermined interval (e.g., every second) to accumulate a plurality of position measurements over time for each of the plurality of remote vehicles 42 in the media 22.

In an exemplary embodiment, if the environment 26 is sparsely populated with vehicles, historical data for the roadway 40 acquired using crowdsourcing and/or a process similar to blocks 104 and 106 may be used to accumulate a plurality of historical position measurements over time for average vehicles on the roadway 40. The plurality of historical position measurements over time may be used in subsequent steps of the method 100 in lieu of the plurality of position measurements over time for each of the plurality of remote vehicles 42. After block 106, the method 100 proceeds to block 108.

At block 108, the controller 14 determines a trajectory of each of the plurality of remote vehicles 42. In an exemplary embodiment, the trajectory of each of the plurality of remote vehicles 42 includes at least a position, a velocity (i.e., a first derivative of the position), an acceleration (i.e., a second derivative of the position), and a jerk (i.e., a third derivative of the position) of each of the plurality of remote vehicles 42. It should be understood that the trajectory further may include additional, higher-order derivatives of the position without departing from the scope of the present disclosure. In an exemplary embodiment, to determine the trajectory, the controller 14 analyzes the plurality of position measurements over time for each of the plurality of remote vehicles 42 saved in the media 22 at block 106. In a non-limiting example, the trajectory of each of the plurality of remote vehicles 42 is saved in the media 22 and continuously updated upon receipt of updated position measurements at block 104. After block 108, the method 100 proceeds to blocks 110, 112, 114, 116, and 118 to determine one or more speed decision algorithm inputs. In the scope of the present disclosure, the one or more speed decision algorithm inputs are data, information, or observations used to determine an optimal speed for the vehicle 12, as will be discussed in greater detail below.

Referring again to FIG. 2 with continued reference to FIG. 3, at block 110, the controller 14 determines a speed of the lead vehicle 42a based at least in part on the trajectory of each of the plurality of remote vehicles 42 (and thus the trajectory of the lead vehicle 42a). The speed of the lead vehicle 42a is one of the one or more speed decision algorithm inputs relevant for determination of the optimal speed for the vehicle 12. For example, the optimal speed of the vehicle 12 should be determined to be less than or equal to the speed of the lead vehicle 42a in order to maintain a comfortable following distance between the lead vehicle 42a and the vehicle 12. After block 110, the method 100 proceeds to block 120, as will be discussed in greater detail below.

At block 112, the controller 14 determines a speed of the one or more adjacent vehicles 42b based at least in part on the trajectory of each of the plurality of remote vehicles 42 (and thus the trajectory of the one or more adjacent vehicles 42b). The speed of the one or more adjacent vehicles 42b is one of the one or more speed decision algorithm inputs relevant for determination of the optimal speed for the vehicle 12. For example, the optimal speed of the vehicle 12 should be determined such as to minimize time that the vehicle 12 remains within a blindspot of the one or more adjacent vehicles 42b. In another example, the optimal speed of the vehicle 12 should be determined to be relatively similar to the speed of the one or more adjacent vehicles 42b such that the optimal speed of the vehicle 12 is commensurate with the flow of traffic on the roadway 40. After block 112, the method 100 proceeds to block 120, as will be discussed in greater detail below.

At block 114, the controller 14 determines the following distance 48 of the following vehicle 42c based at least in part on the trajectory of each of the plurality of remote vehicles 42 (and thus the trajectory of the following vehicle 42c, for example, the position of the following vehicle 42c relative to the vehicle 12). The speed of the following vehicle 42c is one of the one or more speed decision algorithm inputs relevant for determination of the optimal speed for the vehicle 12. For example, if the following distance 48 is below a following distance threshold, the following vehicle 42c may be considered to be tailgating the vehicle 12, and thus the optimal speed of the vehicle 12 may be temporality increased to mitigate tailgating. It should be understood that the following distance threshold may be a fixed threshold (e.g., twenty meters) or a variable threshold which is a function of the speed of the vehicle 12 (e.g., vehicle speed in kilometers per hour divided by 1.2 to provide a three-second following distance threshold in meters). After block 114, the method 100 proceeds to block 120, as will be discussed in greater detail below.

At block 116, the controller 14 determines a current driving lane of the vehicle 12 (e.g., the third driving lane 44c, as shown in FIG. 2) based at least in part on measurements performed using the vehicle perception sensor 16 and/or additional vehicle sensors. In an exemplary embodiment, the controller 14 uses data about lane lines on the roadway 40 measured using the vehicle perception sensor 16 to determine the current driving lane. In another exemplary embodiment, the controller 14 uses the trajectory of each of the plurality of remote vehicles 42 (e.g., the position of the vehicle 12 relative to the plurality of remote vehicles 42) to determine the current driving lane. In another exemplary embodiment, the controller 14 uses additional vehicle sensor measurements (e.g., global navigation satellite system (GNSS) measurements) to determine the current driving lane.

The current driving lane of the vehicle 12 is one of the one or more speed decision algorithm inputs relevant for determination of the optimal speed for the vehicle 12. For example, the optimal speed of the vehicle 12 is determined based at least in part on a regulated or commonly accepted use of the current driving lane. In a non-limiting example, if the current driving lane is a passing lane (i.e., a lane intended for passing of slower vehicles), the optimal speed of the vehicle 12 should be relatively higher. If the current driving lane is a slow lane (i.e., a lane intended for travel of slower vehicles), the optimal speed of the vehicle 12 should be relatively lower. After block 116, the method 100 proceeds to block 120, as will be discussed in greater detail below.

At block 118, the controller 14 receives one or more occupant inputs from an occupant of the vehicle 12. In an exemplary embodiment, the one or more occupant inputs includes at least a desired speed range. In the scope of the present disclosure, the desired speed range is a cruising speed range for the vehicle 12 requested by the occupant. In some examples, the desired speed range is defined between fixed boundaries (e.g., between ninety and one hundred kilometers per hour). In some examples, the desired speed range is defined relative to speeds of the surrounding traffic (i.e., the plurality of remote vehicles 42). In some examples, the desired speed range is defined relative to a posted speed limit of the roadway 40.

In a non-limiting example, the desired speed range may be represented as slower than surrounding traffic (e.g., ten kilometers per hour slower than an average speed of surrounding traffic), commensurate with surrounding traffic (e.g., equal to the average speed of surrounding traffic), or faster than surrounding traffic (e.g., ten kilometers per hour faster than the average speed of surrounding traffic). The desired speed range further may include a minimum and/or maximum speed allowed by the occupant. In some examples, the minimum and/or maximum speed are defined as fixed quantities relative to the desired speed range (e.g., plus or minus ten kilometers per hour relative to the desired speed range). In some examples, the minimum and/or maximum speed are defined as percentages relative to the desired speed range (e.g., plus or minus ten percent of the desired speed range).

In an exemplary embodiment, the one or more occupant inputs are received using an accelerator and/or brake pedal of the vehicle 12. In a non-limiting example, actuation of the brake pedal indicates decrease of the desired speed range or deactivation of the system 10, while actuation of the accelerator pedal indicates increase of the desired speed range. In another exemplary embodiment, the one or more occupant inputs are received using physical and/or software buttons or other input devices located within an occupant compartment of the vehicle 12 (e.g., steering wheel buttons, turn signal stalks, foot pedals, gear shifters, and/or the like). In a non-limiting example, the one or more occupant inputs are received using electrical and/or electromechanical buttons located on a steering wheel of the vehicle 12. In another non-limiting example, the one or more occupant inputs are received using voice recognition (i.e., reception and interpretation of voice commands issued by an occupant of the vehicle 12), gesture recognition (i.e., sensing and interpretation of physical gestures performed by an occupant of the vehicle 12), and/or the like.

In another exemplary embodiment, the one or more occupant inputs are received via occupant interaction with a display within the vehicle 12 (e.g., an instrument display, an infotainment display, and/or the like). In a non-limiting example, the display provides a user interface prompting the occupant to select the desired speed range and the minimum and/or maximum speed. It should be understood that additional systems and methods for occupant interaction to provide the desired speed range and the minimum and/or maximum speed to the controller 14 are also within the scope of the present disclosure. The one or more occupant inputs is one of the one or more speed decision algorithm inputs relevant for determination of the optimal speed for the vehicle 12. After block 118, the method 100 proceeds to block 120.

At block 120, the controller 14 trains a current observation Gaussian Mixture Model (GMM) based at least in part on the trajectory of each of the plurality of remote vehicles 42 determined at block 108 and the one or more speed decision algorithm inputs determined at blocks 110, 112, 114, 116, and 118. In the scope of the present disclosure, the current observation GMM is a probabilistic model for grouping and representing the plurality of remote vehicles 42 based on the trajectory of each of the plurality of remote vehicles 42 determined at block 108 and the one or more speed decision algorithm inputs. In an exemplary embodiment, the current observation GMM includes a mixture of a plurality of Gaussian distributions.

Each of the plurality of Gaussian distributions is defined by a mean vector, a covariance matrix, and a set of mixing coefficients that determine the weight of each of the plurality of Gaussian distributions in the current observation GMM. The current observation GMM is trained using, for example, an Expectation-Maximization (EM) algorithm, which iteratively adjusts the mean vector, covariance matrix, and mixing coefficients of each of the plurality of Gaussian distributions until the current observation GMM optimally represents the environment 26 based on the trajectory of each of the plurality of remote vehicles 42 and the one or more speed decision algorithm inputs.

In a non-limiting example, subgroups within the plurality of remote vehicles 42 having similarity in trajectory and/or speed decision algorithm inputs are identified. Each subgroup is represented by one of the plurality of Gaussian distributions, and the mean vector, covariance matrix, and mixing coefficients of each of the plurality of Gaussian distributions are iteratively adjusted until the current observation GMM optimally represents the environment 26. After block 120, the method 100 proceeds to block 122.

At block 122, the controller 14 determines the optimal vehicle speed for the vehicle 12. Methods for determining the optimal vehicle speed for the vehicle 12 will be discussed in greater detail below. After block 122, the method 100 proceeds to block 124.

At block 124, the controller 14 controls the vehicle such that a speed of the vehicle 12 is the optimal vehicle speed determined at block 122. In an exemplary embodiment, the controller 14 uses the automated driving system 18 to control acceleration and braking of the vehicle 12 in order to maintain the optimal vehicle speed. In another exemplary embodiment, the controller 14 continuously monitors the one or more occupant inputs and uses the automated driving system 18 to control acceleration and braking of the vehicle 12 in order to maintain the optimal vehicle speed based at least in part on the one or more occupant inputs. In a non-limiting example, if the occupant actuates the brake pedal of the vehicle 12 the controller 14 commands the automated driving system 18 to decrease the speed of the vehicle 12 or disables the automated driving system 18, such that the occupant takes manual control of the speed of the vehicle 12.

In an exemplary embodiment, the controller 14 suggests elevated automation levels based at least in part on the one or more speed decision algorithm inputs, the one or more occupant inputs, and/or the trajectory of each of the plurality of remote vehicles 42. In a non-limiting example, if the current driving lane is a slow lane, the controller 14 suggests activation of the partially automated operation mode of the automated driving system 18 in order to autonomously execute a lane change maneuver. In another non-limiting example, if the occupant activates a turn signal of the vehicle 12, the controller 14 suggests activation of the partially automated operation mode of the automated driving system 18 in order to autonomously execute a lane change maneuver. In a non-limiting example, the controller 14 uses a display or other human-interface device (HID) to prompt and/or inform the occupant before entering an elevated automation level. After block 124, the method 100 proceeds to enter a standby state at block 126.

In an exemplary embodiment, the controller 14 repeatedly exits the standby state 126 and restarts the method 100 at block 102. In a non-limiting example, the controller 14 exits the standby state 126 and restarts the method 100 on a timer, for example, every three hundred milliseconds.

Figure 4:
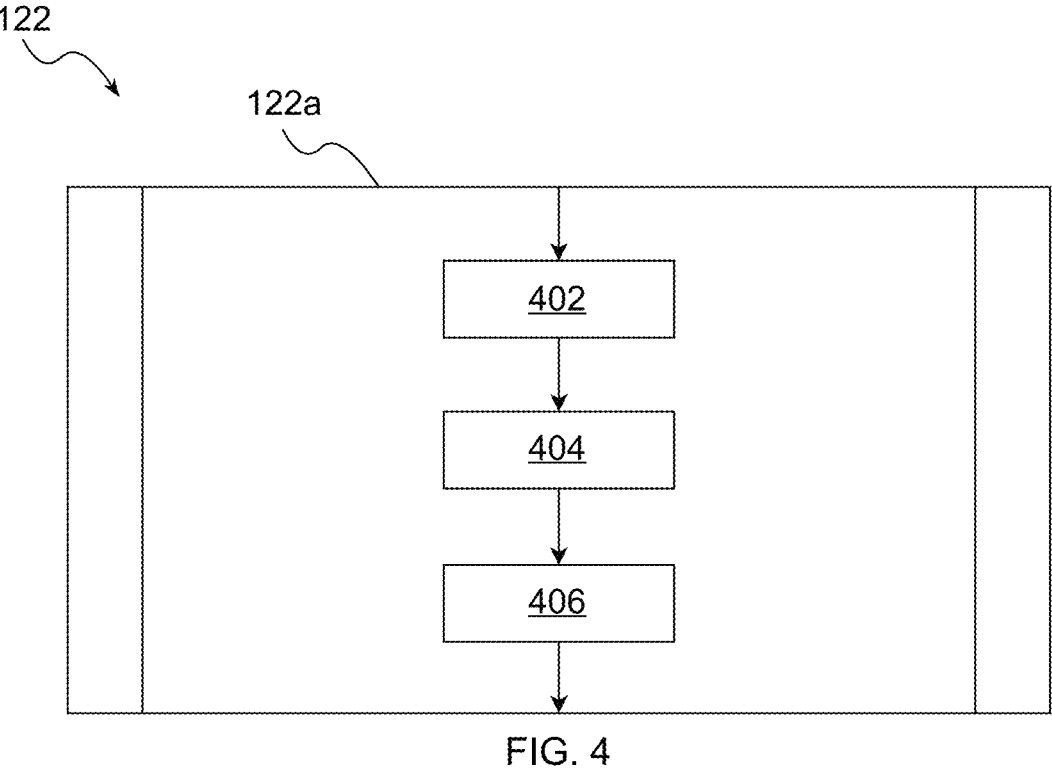
FIG. 4 is a flowchart of a first method for determining an optimal vehicle speed, according to an exemplary embodiment.

Referring to FIG. 4, a flowchart of a first exemplary embodiment 122a of block 122 (i.e., a first method for determining the optimal vehicle speed) is shown. The first exemplary embodiment 122a of block 122 begins at block 402. At block 402, a plurality of pre-trained Gaussian Mixture Models (GMM) are trained. In an exemplary embodiment, the plurality of pre-trained GMMs are trained using a plurality of training data. In a non-limiting example, the plurality of training data includes a plurality of sets of training vehicle trajectories and training speed decision algorithm inputs. Each of the plurality of training vehicle trajectories and training speed decision algorithm inputs is labeled with one of a plurality of trained optimal speeds.

In an exemplary embodiment, the plurality of training data is collected by a training vehicle (not shown) equipped with similar sensors to the vehicle 12 (i.e., the vehicle perception sensor 16) and occupied with a human occupant. As the training vehicle is driven, the training vehicle collects the plurality of sets of training vehicle trajectories and training speed decision algorithm inputs and records a trained optimal speed driven by the occupant corresponding to each set of training vehicle trajectories and training speed decision algorithm inputs. It should be understood that additional methods for obtaining the plurality of training data, including, for example, crowdsourcing, computer simulation, and/or the like are within the scope of the present disclosure.

In an exemplary embodiment, each of the plurality of pre-trained GMMs is trained using sets of training vehicle trajectories and training speed decision algorithm inputs corresponding to one of the plurality of trained optimal speeds. In a non-limiting example, the plurality of pre-trained GMMs includes a first pre-trained GMM trained for a first optimal speed (e.g., one hundred kilometers per hour), a second pre-trained GMM trained for a second optimal speed (e.g., one hundred and ten kilometers per hour), and a third pre-trained GMM trained for a third optimal speed (e.g., one hundred and twenty kilometers per hour). Therefore, each of the plurality of pre-trained GMMs is associated with one of the plurality of trained optimal speeds.

In an exemplary embodiment, each of the plurality of pre-trained GMMs includes a mixture of a plurality of Gaussian distributions. Each of the plurality of Gaussian distributions is defined by a mean vector, a covariance matrix, and a set of mixing coefficients that determine the weight of each of the plurality of Gaussian distributions in each of the plurality of pre-trained GMMs. Each of the plurality of pre-trained GMMs are trained using, for example, an Expectation-Maximization (EM) algorithm, which iteratively adjusts the mean vector, covariance matrix, and mixing coefficients of each of the plurality of Gaussian distributions until each of the plurality of pre-trained GMMs optimally represent each set of training vehicle trajectories and training speed decision algorithm inputs labeled with one of the plurality of trained optimal speeds.

In a non-limiting example, subgroups within each set of training vehicle trajectories and training speed decision algorithm inputs having similarity in trajectory and/or speed decision algorithm inputs are identified. Each subgroup is represented by one of the plurality of Gaussian distributions, and the mean vector, covariance matrix, and mixing coefficients of each of the plurality of pre-trained GMMs accurately represent each set of training vehicle trajectories and training speed decision algorithm inputs labeled with one of the plurality of trained optimal speeds.

In an exemplary embodiment, the plurality of pre-trained GMMs are trained using the controller 14 of the system 10. In another exemplary embodiment, the plurality of pre-trained GMMs are trained using an external system such as, for example, a cloud-based server or other computing device. In a non-limiting example, the plurality of pre-trained GMMs are transferred to the controller 14 and stored in the media 22 of the controller 14. After block 402, the first exemplary embodiment 122a of block 122 proceeds to block 404.

At block 404, the controller 14 selects a matching pre-trained GMM from the plurality of pre-trained GMMs trained at block 402. In an exemplary embodiment, to select the matching pre-trained GMM, the controller 14 compares the current observation GMM trained at block 120 to the plurality of pre-trained GMMs trained at block 402. In an exemplary embodiment, to compare the current observation GMM to the plurality of pre-trained GMMs, the controller 14 uses probabilistic comparison methods such as, for example, Kullback-Leibler (KL) divergence, Bhattacharyya distance, Hellinger distance, earth mover's distance (EMD)/Wasserstein distance, likelihood ratio test, overlap integral, component matching, entropy-based measures, log-likelihood comparison, log-likelihood ratio test, and/or the like. The matching pre-trained GMM is chosen to be the one of the plurality of pre-trained GMMs which most closely matches the current observation GMM. In the scope of the present disclosure, most closely matches means that the matching pre-trained GMM has a highest statistical correlation with the current observation GMM relative to each of the plurality of pre-trained GMMs. After block 404, the first exemplary embodiment 122a of block 122 proceeds to block 406.

At block 406, the controller 14 determines the optimal vehicle speed based at least in part on the matching pre-trained GMM. In an exemplary embodiment, the optimal vehicle speed is determined to be the one of the plurality of trained optimal speeds associated with the matching pre-trained GMM. In an exemplary embodiment, the optimal vehicle speed is further determined based at least in part on the desired speed range determined at block 118. In a non-limiting example, if the one of the plurality of trained optimal speeds associated with the matching pre-trained GMM is significantly different from the desired speed range (e.g., greater than or equal to a twenty percent difference), the occupant is notified. In another non-limiting example, if the one of the plurality of trained optimal speeds associated with the matching pre-trained GMM is significantly different from the desired speed range, the system 10 is disabled. After block 406, the first exemplary embodiment 122a of block 122 is concluded, and the method 100 proceeds as discussed above.

Figure 5:
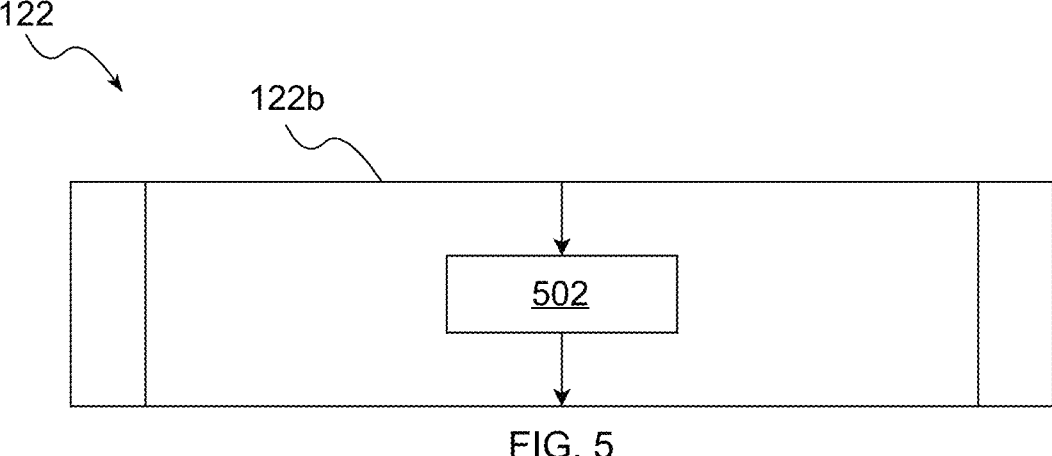
FIG. 5 is a flowchart of a second method for determining the optimal vehicle speed, according to an exemplary embodiment.

Referring to FIG. 5, a flowchart of a second exemplary embodiment 122b of block 122 (i.e., a second method for determining the optimal vehicle speed) is shown. The second exemplary embodiment 122b of block 122 begins at block 502. At block 502, the controller 14 executes an optimal speed determination machine learning algorithm to determine the optimal vehicle speed. In a non-limiting example, the optimal speed determination machine learning algorithm includes multiple layers, including an input layer and an output layer, as well as one or more hidden layers.

The input layer receives the current observation GMM trained at block 120, the desired speed range determined at block 118, and the one or more speed decision algorithm inputs determined at blocks 110-118 as inputs. The inputs are then passed on to the hidden layers. Each hidden layer applies a transformation (e.g., a non-linear transformation) to the data and passes the result to the next hidden layer until the final hidden layer. The output layer produces the optimal vehicle speed.

To train the optimal speed determination machine learning algorithm, a dataset of inputs and their corresponding optimal vehicle speed is used. The algorithm is trained by adjusting internal weights between nodes in each hidden layer to minimize prediction error. During training, an optimization technique (e.g., gradient descent) is used to adjust the internal weights to reduce the prediction error. The training process is repeated with the entire dataset until prediction error is minimized, and the resulting trained model is then used to process new input data.

After sufficient training of the optimal speed determination machine learning algorithm, the algorithm is capable of determining optimal vehicle speed based on the current observation GMM trained at block 120, the desired speed range determined at block 118, and the one or more speed decision algorithm inputs determined at blocks 110-118. By adjusting the weights between the nodes in each hidden layer during training, the algorithm "learns" to recognize patterns in the input data that are indicative of optimal vehicle speed. After block 502, the second exemplary embodiment 122b of block 122 is concluded, and the method 100 proceeds as discussed above.

The system 10 and method 100 of the present disclosure offer several advantages. By accounting for the speed of the lead vehicle 42a, the speed of the one or more adjacent vehicles 42b, the following distance of the following vehicle 42c, the current driving lane, and the one or more occupant inputs in determination of optimal vehicle speed for the vehicle 12, the system 10 and method 100 provide for comprehensive consideration of the conditions surrounding the vehicle. By using Gaussian Mixture Models to characterize the trajectories of the plurality of remote vehicles 42, large amounts of data are efficiently aggregated and represented in a statistical manner for interpretation or further processing by the optimal speed determination machine learning algorithm. Overall, the system 10 and method 100 of the present disclosure allow for determination of an optimal vehicle speed for the vehicle 12 based on multiple factors, including the behaviors of the plurality of remote vehicles 42 near the vehicle 12.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for adaptive cruise control for a vehicle, the method comprising:
    performing a plurality of measurements of an environment surrounding the vehicle using a vehicle perception sensor, wherein the environment surrounding the vehicle includes a plurality of remote vehicles, wherein performing the plurality of measurements further comprises:
        measuring a position of each of the plurality of remote vehicles using the vehicle perception sensor;

saving the position of each of the plurality of remote vehicles and a time at which the position of each of the plurality of remote vehicles was measured in a non-transitory memory;

repeating the measuring step and the saving step at a predetermined interval such as to accumulate a plurality of position measurements over time for each of the plurality of remote vehicles; and determining a trajectory of each of the plurality of remote vehicles based at least in part on the plurality of position measurements over time;

determining one or more speed decision algorithm inputs based at least in part on the plurality of measurements;

determining an optimal vehicle speed for the vehicle based at least in part on the one or more speed decision algorithm inputs, wherein determining the optimal vehicle speed further comprises:

training a plurality of pre-trained Gaussian Mixture Models (GMM) using a plurality of training data, wherein each of the plurality of pre-trained GMMs is labeled with one of a plurality of trained optimal speeds;

training a current observation GMM based at least in part on the trajectory of each of the plurality of remote vehicles;

comparing the current observation GMM to the plurality of pre-trained GMMs;

selecting a matching pre-trained GMM from the plurality of pre-trained GMMs which most closely matches with the current observation GMM; and determining the optimal vehicle speed based at least in part on the one of the plurality of trained optimal speeds with which the matching pre-trained GMM is labeled; and controlling the vehicle such that a speed of the vehicle is the optimal vehicle speed.

2. The method of claim 1, wherein determining the optimal vehicle speed further comprises:
    receiving a desired speed range from an occupant of the vehicle; and
    determining the optimal vehicle speed based at least in part on the one of the plurality of trained optimal speeds with which the matching pre-trained GMM is labeled and the desired speed range.

3. The method of claim 1, wherein determining the optimal vehicle speed further comprises:
    training a current observation Gaussian Mixture Model (GMM) based at least in part on the trajectory of each of the plurality of remote vehicles;
    receiving a desired speed range from an occupant of the vehicle; and
    executing an optimal speed determination machine learning algorithm, wherein the optimal speed determination machine learning algorithm is configured to receive the current observation GMM, the desired speed range, and the one or more speed decision algorithm inputs as inputs and provide the optimal vehicle speed as an output.

4. The method of claim 1, wherein determining the one or more speed decision algorithm inputs further comprises:
    determining a speed of a lead vehicle of the plurality of remote vehicles based at least in part on the plurality of measurements, wherein the lead vehicle is directly ahead of the vehicle and in a same driving lane as the vehicle; and determining the one or more speed decision algorithm inputs, wherein the one or more speed decision algorithm inputs includes at least the speed of the lead vehicle.

5. The method of claim 1, wherein determining the one or more speed decision algorithm inputs further comprises:

determining a speed of one or more adjacent vehicles of the plurality of remote vehicles based at least in part on the plurality of measurements, wherein the one or more adjacent vehicles are located within a predetermined radius of the vehicle, and wherein the one or more adjacent vehicles are located in a different driving lane from the vehicle; and determining the one or more speed decision algorithm inputs, wherein the one or more speed decision algorithm inputs includes at least the speed of the one or more adjacent vehicles.

6. The method of claim 1, wherein determining the one or more speed decision algorithm inputs further comprises:

determining a following distance of a following vehicle of the plurality of remote vehicles based at least in part on the plurality of measurements, wherein the following vehicle is located directly behind the vehicle and in a same driving lane as the vehicle, and wherein the following distance is a distance between the following vehicle and the vehicle; and determining the one or more speed decision algorithm inputs, wherein the one or more speed decision algorithm inputs includes at least the following distance.

7. The method of claim 1, wherein determining the one or more speed decision algorithm inputs further comprises:

determining a current driving lane of the vehicle based at least in part on the plurality of measurements; and determining the one or more speed decision algorithm inputs, wherein the one or more speed decision algorithm inputs includes at least the current driving lane of the vehicle.

8. The method of claim 1, wherein determining the one or more speed decision algorithm inputs further comprises:

receiving one or more occupant inputs from an occupant of the vehicle; and determining the one or more speed decision algorithm inputs, wherein the one or more speed decision algorithm inputs includes at least the one or more occupant inputs.

9. The method of claim 1, wherein training the plurality of pre-trained GMMs further comprises:

collecting the plurality of training data using a training vehicle occupied with a human occupant, wherein as the training vehicle is driven, the training vehicle collects a plurality of sets of training vehicle trajectories and training speed decision algorithm inputs and records a trained optimal speed driven by the human occupant corresponding to each set of training vehicle trajectories and training speed decision algorithm inputs.

10. A system for adaptive cruise control for a vehicle, the system comprising:

a vehicle perception sensor;

an automated driving system; and a controller in electrical communication with the vehicle perception sensor and the automated driving system, wherein the controller is programmed to:

perform a plurality of measurements of an environment surrounding the vehicle using the vehicle perception sensor, wherein the environment surrounding the vehicle includes a plurality of remote vehicles, and wherein the plurality of measurements includes a trajectory of each of the plurality of remote vehicles;

determine one or more speed decision algorithm inputs based at least in part on the plurality of measurements;

determine an optimal vehicle speed for the vehicle based at least in part on the one or more speed decision algorithm inputs, wherein to determine the optimal vehicle speed, the controller is further programmed to:

train a current observation GMM based at least in part on the trajectory of each of the plurality of remote vehicles and the one or more speed decision algorithm inputs;

compare the current observation GMM to a plurality of pre-trained GMMs, wherein each of the plurality of pre-trained GMMs is labeled with one of a plurality of trained optimal speeds;

select a matching pre-trained GMM from the plurality of pre-trained GMMs which most closely matches with the current observation GMM; and determine the optimal vehicle speed based at least in part on the one of the plurality of trained optimal speeds with which the matching pre-trained GMM is labeled; and control the vehicle using the automated driving system such that a speed of the vehicle is the optimal vehicle speed.

11. The system of claim 10, wherein to determine the optimal vehicle speed, the controller is further programmed to:

receive a desired speed range from an occupant of the vehicle; and determine the optimal vehicle speed based at least in part on the one of the plurality of trained optimal speeds with which the matching pre-trained GMM is labeled and the desired speed range.

12. The system of claim 10, wherein to determine the optimal vehicle speed, the controller is further programmed to:

train the current observation GMM based at least in part on the trajectory of each of the plurality of remote vehicles;

receive a desired speed range from an occupant of the vehicle; and execute an optimal speed determination machine learning algorithm, wherein the optimal speed determination machine learning algorithm is configured to receive the current observation GMM, the desired speed range, and the one or more speed decision algorithm inputs as inputs and provide the optimal vehicle speed as an output.

13. The system of claim 10, wherein to determine the one or more speed decision algorithm inputs, the controller is further programmed to:

determine a speed of a lead vehicle of the plurality of remote vehicles based at least in part on the plurality of measurements, wherein the lead vehicle is directly ahead of the vehicle and in a same driving lane as the vehicle;

determine a speed of one or more adjacent vehicles of the plurality of remote vehicles based at least in part on the plurality of measurements, wherein the one or more adjacent vehicles are located within a predetermined radius of the vehicle, and wherein the one or more adjacent vehicles are located in a different driving lane from the vehicle;

determine a following distance of a following vehicle of the plurality of remote vehicles based at least in part on the plurality of measurements, wherein the following vehicle is located directly behind the vehicle and in a same driving lane as the vehicle, and wherein the following distance is a distance between the following vehicle and the vehicle;

determine a current driving lane of the vehicle based at least in part on the plurality of measurements; and determine the one or more speed decision algorithm inputs, wherein the one or more speed decision algorithm inputs includes at least the speed of the lead vehicle, the speed of the one or more adjacent vehicles, the following distance, and the current driving lane.

14. The system of claim 13, wherein to determine the one or more speed decision algorithm inputs, the controller is further programmed to:

receive one or more occupant inputs from an occupant of the vehicle, wherein the one or more occupant inputs includes at least a desired speed range; and determine the one or more speed decision algorithm inputs, wherein the one or more speed decision algorithm inputs includes at least the one or more occupant inputs.

15. The system of claim 14, wherein to control the vehicle using the automated driving system, the controller is further programmed to:

continuously monitor the one or more occupant inputs from the occupant of the vehicle; and command the automated driving system to control acceleration and braking of the vehicle based at least in part on the optimal vehicle speed and the one or more occupant inputs.

16. The system of claim 10, wherein the current observation GMM is a probabilistic model for grouping and representing the plurality of remote vehicles based on the trajectory of each of the plurality of remote vehicles and the one or more speed decision algorithm inputs, wherein the current observation GMM includes a mixture of a plurality of Gaussian distributions, wherein each of the plurality of Gaussian distributions is defined by a mean vector, a covariance matrix, and a set of mixing coefficients that determine a weight of each of the plurality of Gaussian distributions in the current observation GMM, and wherein to train the current observation GMM, the controller is further programmed to:

identify one or more subgroups within the plurality of remote vehicles having similarity in trajectory and speed decision algorithm inputs, wherein each subgroup is represented by one of the plurality of Gaussian distributions; and iteratively adjust the mean vector, covariance matrix, and mixing coefficients of each of the plurality of Gaussian distributions until the current observation GMM optimally represents the environment surrounding the vehicle.

17. A method for adaptive cruise control for a vehicle, the method comprising:

measuring a position of each of a plurality of remote vehicles using a vehicle perception sensor;

saving the position of each of the plurality of remote vehicles and a time at which the position of each of the plurality of remote vehicles was measured in a non-transitory memory;

repeating the measuring step and the saving step at a predetermined interval such as to accumulate a plurality of position measurements over time for each of the plurality of remote vehicles;

determining a trajectory of each of the plurality of remote vehicles based at least in part on the plurality of position measurements over time, wherein the trajectory of each of the plurality of remote vehicles includes at least a position, a velocity, an acceleration, and a jerk of each of the plurality of remote vehicles;

determining one or more speed decision algorithm inputs based at least in part on the trajectory of each of the plurality of remote vehicles;

determining an optimal vehicle speed for the vehicle based at least in part on the one or more speed decision algorithm inputs, wherein determining the optimal vehicle speed further comprises:

training a plurality of pre-trained Gaussian Mixture Models (GMM) using a plurality of training data, wherein the plurality of training data includes a plurality of sets of training vehicle trajectories, wherein each of the plurality of sets of training vehicle trajectories is labeled with one of a plurality of trained optimal speeds;

training a current observation GMM based at least in part on the trajectory of each of the plurality of remote vehicles and the one or more speed decision algorithm inputs;

comparing the current observation GMM to the plurality of pre-trained GMMs;

selecting a matching pre-trained GMM from the plurality of pre-trained GMMs which most closely matches with the current observation GMM;

receiving a desired speed range from an occupant of the vehicle; and determining the optimal vehicle speed based at least in part on the one of the plurality of trained optimal speeds with which the matching pre-trained GMM is labeled and the desired speed range; and controlling the vehicle such that a speed of the vehicle is the optimal vehicle speed.

18. The method of claim 17, wherein determining the one or more speed decision algorithm inputs further comprises:

determining a speed of a lead vehicle of the plurality of remote vehicles based at least in part on the trajectory of each of the plurality of remote vehicles, wherein the lead vehicle is directly ahead of the vehicle and in a same driving lane as the vehicle;

determining a speed of one or more adjacent vehicles of the plurality of remote vehicles based at least in part on the trajectory of each of the plurality of remote vehicles, wherein the one or more adjacent vehicles are located within a predetermined radius of the vehicle, and wherein the one or more adjacent vehicles are located in a different driving lane from the vehicle;

determining a following distance of a following vehicle of the plurality of remote vehicles based at least in part on the trajectory of each of the plurality of remote vehicles, wherein the following vehicle is located directly behind the vehicle and in a same driving lane as the vehicle, and wherein the following distance is a distance between the following vehicle and the vehicle;

determining a current driving lane of the vehicle based at least in part on the trajectory of each of the plurality of remote vehicles; and determining the one or more speed decision algorithm inputs, wherein the one or more speed decision algorithm inputs includes at least the speed of the lead vehicle, the speed of the one or more adjacent vehicles, the following distance, and the current driving lane.

19. The method of claim 17, wherein training the plurality of pre-trained GMMs further comprises:

collecting the plurality of training data using a training vehicle occupied with a human occupant, wherein as the training vehicle is driven, the training vehicle collects the plurality of sets of training vehicle trajectories and training speed decision algorithm inputs and records a trained optimal speed driven by the human occupant corresponding to each set of training vehicle trajectories and training speed decision algorithm inputs; and training each of the plurality of pre-trained GMMs using an Expectation-Maximization algorithm, wherein each of the plurality of pre-trained GMMs includes a mixture of a plurality of Gaussian distributions, wherein each of the plurality of Gaussian distributions is defined by a mean vector, a covariance matrix, and a set of mixing coefficients that determine a weight of each of the plurality of Gaussian distributions in each of the plurality of pre-trained GMMs, and wherein the Expectation-Maximization algorithm is configured to iteratively adjust the mean vector, covariance matrix, and mixing coefficients of each of the plurality of Gaussian distributions until each of the plurality of pre-trained GMMs optimally represent each set of training vehicle trajectories and training speed decision algorithm inputs labeled with one of the plurality of trained optimal speeds.

20. The method of claim 19, wherein comparing the current observation GMM to the plurality of pre-trained GMMs and selecting the matching pre-trained GMM from the plurality of pre-trained GMMs further comprises:

comparing the current observation GMM to the plurality of pre-trained GMMs using a probabilistic comparison method; and selecting the matching pre-trained GMM from the plurality of pre-trained GMMs, wherein the matching pre-trained GMM has a highest statistical correlation with the current observation GMM relative to each of the plurality of pre-trained GMMs.

* * * * *